(12) United States Patent
Wilson

(10) Patent No.: US 9,622,453 B2
(45) Date of Patent: Apr. 18, 2017

(54) PORTABLE CATTLE WING

(71) Applicant: Burlington Welding LLC, Burlington, OK (US)

(72) Inventor: Robert Leroy Wilson, Cherokee, OK (US)

(73) Assignee: Burlington Welding LLC, Cherokee, OK (US)

(\*) Notice: Subject to any disclaimer, the term of this patent is extended or adjusted under 35 U.S.C. 154(b) by 38 days.

(21) Appl. No.: 14/595,157

(22) Filed: Jan. 12, 2015

(65) Prior Publication Data

US 2015/0250136 A1    Sep. 10, 2015

Related U.S. Application Data

(60) Provisional application No. 61/926,209, filed on Jan. 10, 2014.

(51) Int. Cl.
*A01K 1/00* (2006.01)
*A01K 3/00* (2006.01)

(52) U.S. Cl.
CPC ..................... *A01K 3/00* (2013.01)

(58) Field of Classification Search
CPC .................................................. A01K 31/00
USPC .................. 119/512–514, 516, 519, 522
See application file for complete search history.

(56) References Cited

U.S. PATENT DOCUMENTS

| | | | | |
|---|---|---|---|---|
| 3,545,407 A | * | 12/1970 | Moore | A01K 3/00 119/502 |
| 5,381,757 A | * | 1/1995 | Putney | A01K 3/00 119/512 |
| 5,899,171 A | * | 5/1999 | Abrahamson | A01K 3/00 119/512 |
| 7,237,510 B2 | * | 7/2007 | White | A61D 3/00 119/512 |
| 8,534,230 B2 | * | 9/2013 | Wilson | A01K 3/00 119/516 |
| 2011/0120384 A1 | * | 5/2011 | Wilson | A01K 3/00 119/521 |
| 2011/0180012 A1 | * | 7/2011 | Meyer, Jr. | A01K 1/0017 119/512 |

\* cited by examiner

*Primary Examiner* — Kristen C Hayes
(74) *Attorney, Agent, or Firm* — Martin S. High, P.C.

(57) ABSTRACT

Ranchers and other owners of livestock commonly have a need for a transportable means of setting up a corral for numerous purposes. Sorting must take place in a remote location or a location without a permanent corral, which are prohibitively time consuming and expensive to build. In many cases, a simple, but robust, fencing structure is needed to guide the cattle in the proper direction into a separate sorting corral. A preferred embodiment of the Portable Cattle Wing is comprised of two twenty-four foot panels; two twenty-two foot panels; two twelve foot panels; two four foot gates; two twelve foot gates; a main frame; a plurality of swing-out braces; and a goose-neck hitch.

5 Claims, 14 Drawing Sheets

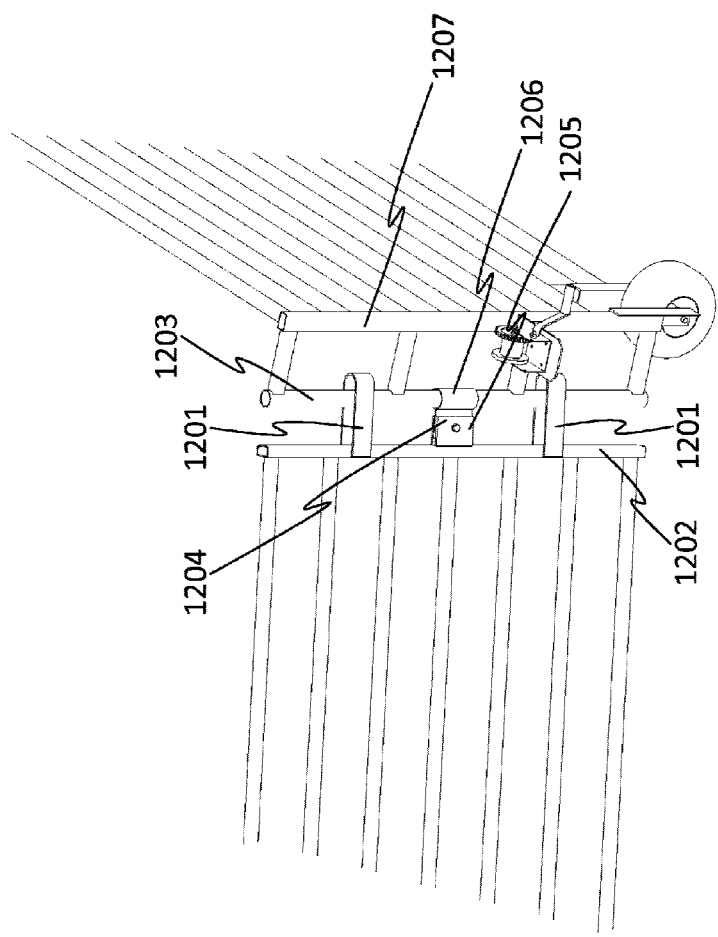

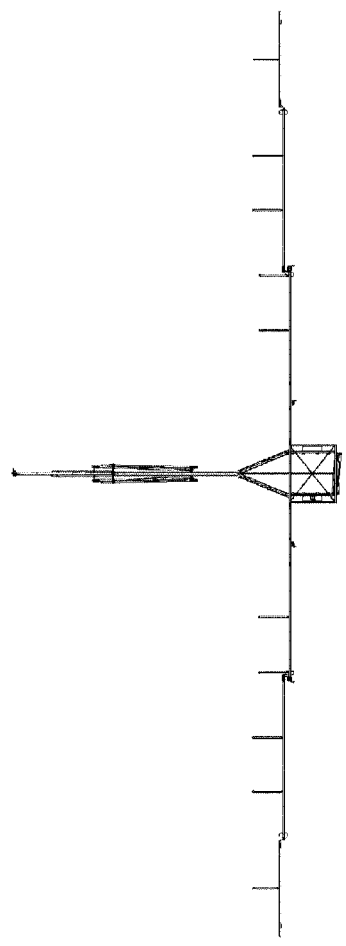
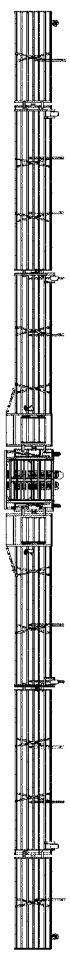
FIG 13A
FIG 13B

PORTABLE CATTLE WING

CROSS-REFERENCE TO RELATED APPLICATIONS

This application claims priority of U.S. provisional patent application with Ser. No. 61/926,209 titled "Portable Cattle Wing" filed on Jan. 10, 2014. The entire contents of U.S. provisional patent application with Ser. No. 61/926,209 are herein incorporated by reference.

STATEMENT REGARDING FEDERALLY SPONSORED RESEARCH OR DEVELOPMENT

Not applicable.

FIELD OF THE EMBODIMENTS

The field of the embodiments is transportable livestock corrals.

BACKGROUND OF THE EMBODIMENTS

Ranchers and other owners of livestock commonly have a need for a may need to sort the livestock for veterinary procedures, to sort by gender, or for marketing purposes. Many times this sorting must take place in a remote location or a location without a permanent corral. Building corrals in such locations is prohibitively time consuming and expensive. Therefore, a corral that is both portable and that serves the various sorting needs of a livestock owner is of great value.

SUMMARY OF THE EMBODIMENTS

The embodiments of the Portable Cattle Wing are comprised of two twenty-four foot (24 ft) panels, wherein each twenty-four foot panel is comprised of a four foot (4 ft) gate; two twenty-two foot (22 ft) panels; six twelve foot (12 ft) panels; a central main frame; a plurality of swing-out braces; one or more off-set hinges; a rear cage; and a goose-neck hitch. Embodiments of the Portable Cattle Wing are comprised of two halves comprised of matched components. That is, one twenty-four foot panel, one twenty-two foot panel, and three twelve foot panels are arranged on either side of the central main frame. The twenty-four foot panels are positioned next to the rear cage and are connected to the rear cage via one or more off-set hinges. Connected to each twenty-four foot panel via off-set hinges is one twenty-two foot panel. Connected to each twenty-two foot panel via off-set hinges is one rear twelve foot panel (one of the three twelve foot panels arranged on each side of the main frame). Connected to the main frame via one or more off-set hinges is a first front twelve foot panel (a second of the three twelve foot panels arranged on each side of the main frame) which is, in turn, connected via one or more off-set hinges to a second front twelve foot panel (the third of the three twelve foot panels arranged on each side of the main frame). The second front twelve foot panel can be arranged to form a closed corral on one or both sides of the main frame (see FIG. 2) by latching with the rear twelve foot panel. In another configuration, the second front twelve foot panel can be arranged to form an alley way on one or both sides of the main frame (see FIG. 6) with the rear twelve foot panel.

In this respect, it is to be understood that the embodiments in this application are not limited to the details of construction and to the arrangements of the components set forth in the description or illustrated in the drawings. The embodiments are capable of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the embodiments described in this application. Additional benefits and advantages of the present embodiments will become apparent in those skilled in the art to which the embodiments relate from the description of the preferred embodiment and the appended claims, taken in conjunction with the accompanying drawings. It is important, therefore, that the claims be regarded as including such equivalent constructions insofar as they do not depart from the spirit and scope of the embodiments described herein.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

BRIEF DESCRIPTION OF THE DRAWINGS

FIG. 12 is a perspective view of an embodiment of the offset hinge.

FIG. 13A is a top view of an embodiment of the Portable Cattle Wing with the wing panels in the extended orientation; FIG. 13B is a side view of an embodiment of the Portable Cattle Wing with the wing panels in the extended orientation.

DETAILED DESCRIPTION OF THE PREFERRED EMBODIMENTS

Figure 1:
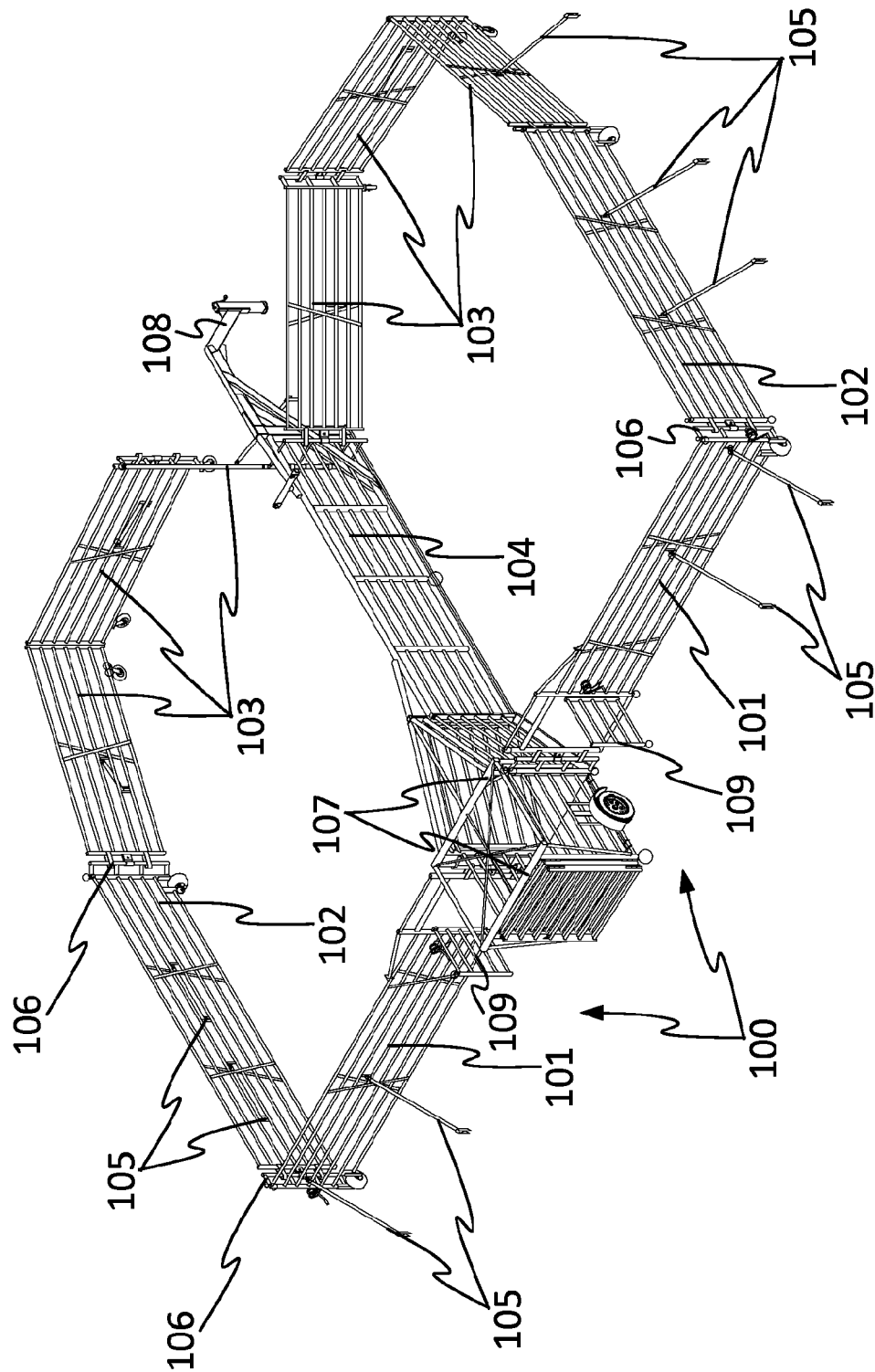
FIG. 1 is a perspective view of an embodiment of the Portable Cattle Wing.

Embodiments of the Portable Cattle Wing 100 are comprised of two twenty-four foot (24 ft) panels 101, wherein each twenty-four foot panel is comprised of a four foot (4 ft) gate 109; two twenty-two foot (22 ft) panels 102; six twelve foot (12 ft) panels 103; a central main frame 104; a plurality of swing-out braces 105; one or more off-set hinges 106; a rear cage 107; and a goose-neck hitch 108.

Figure 2:
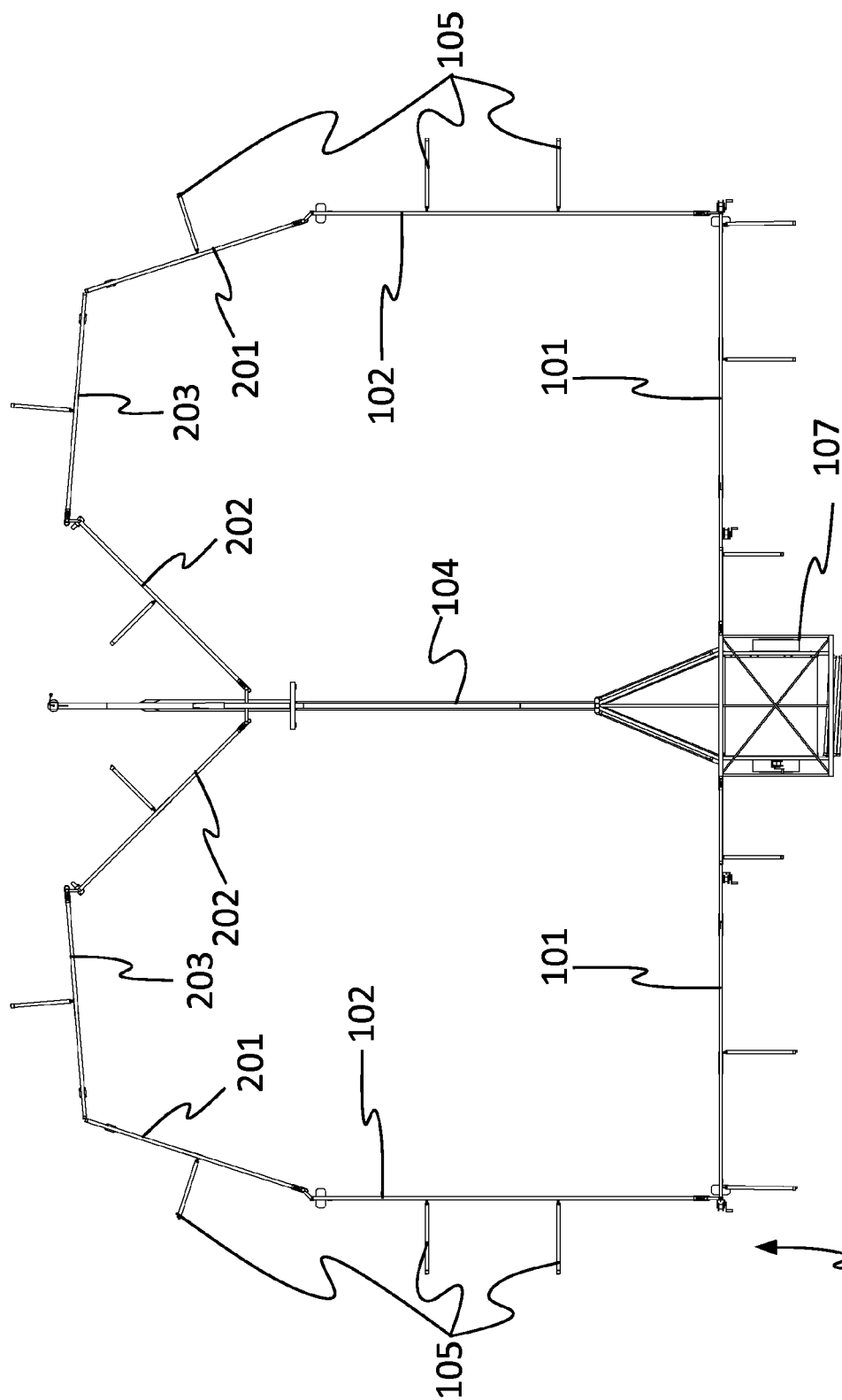
FIG. 2 is a top view of an embodiment of the Portable Cattle Wing with the wing panels in the deployed orientation.
Figure 3:
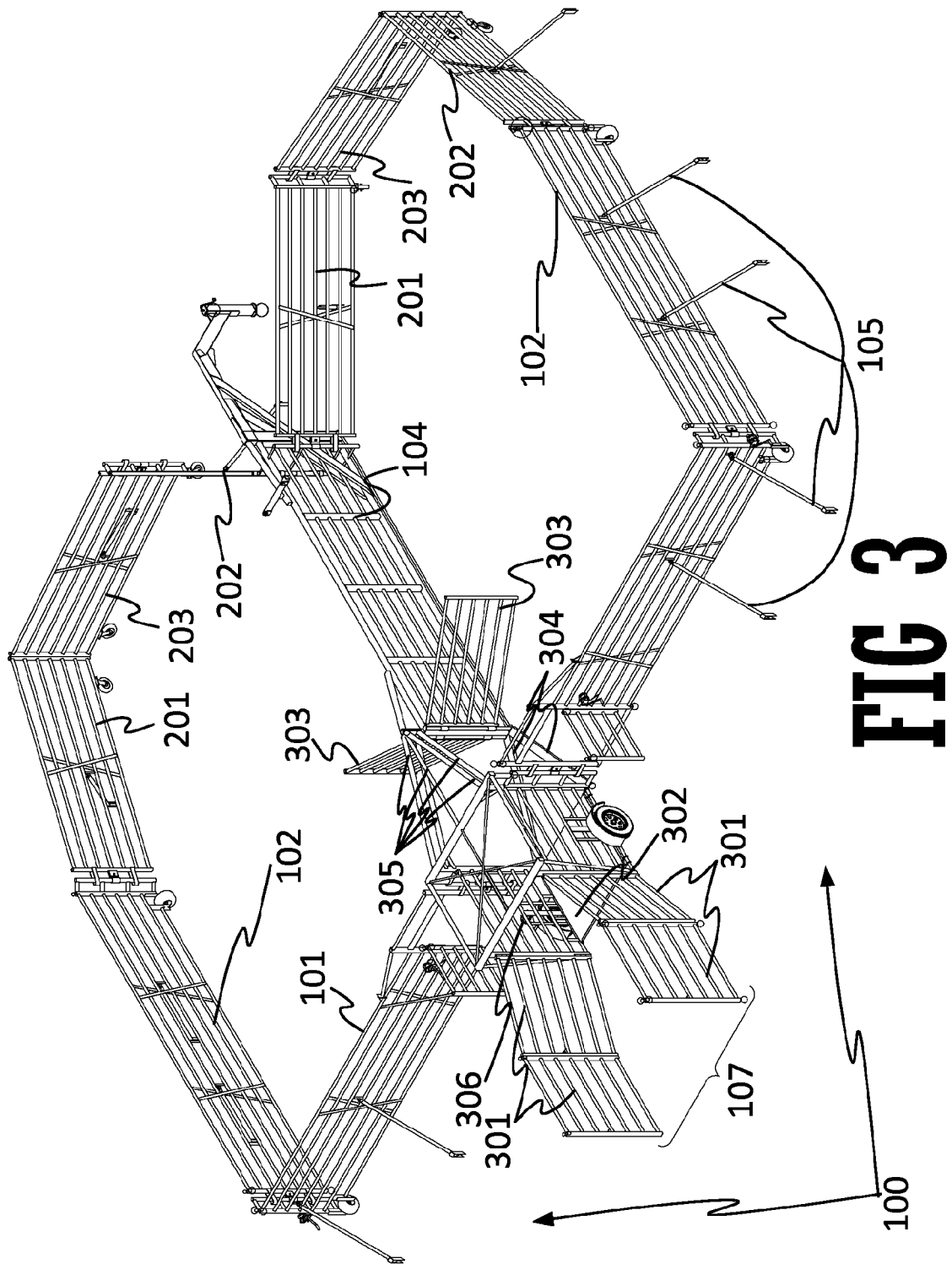
FIG. 3 is a perspective view of an embodiment of the Portable Cattle Wing with the wing panels in the deployed orientation.
Figure 4:
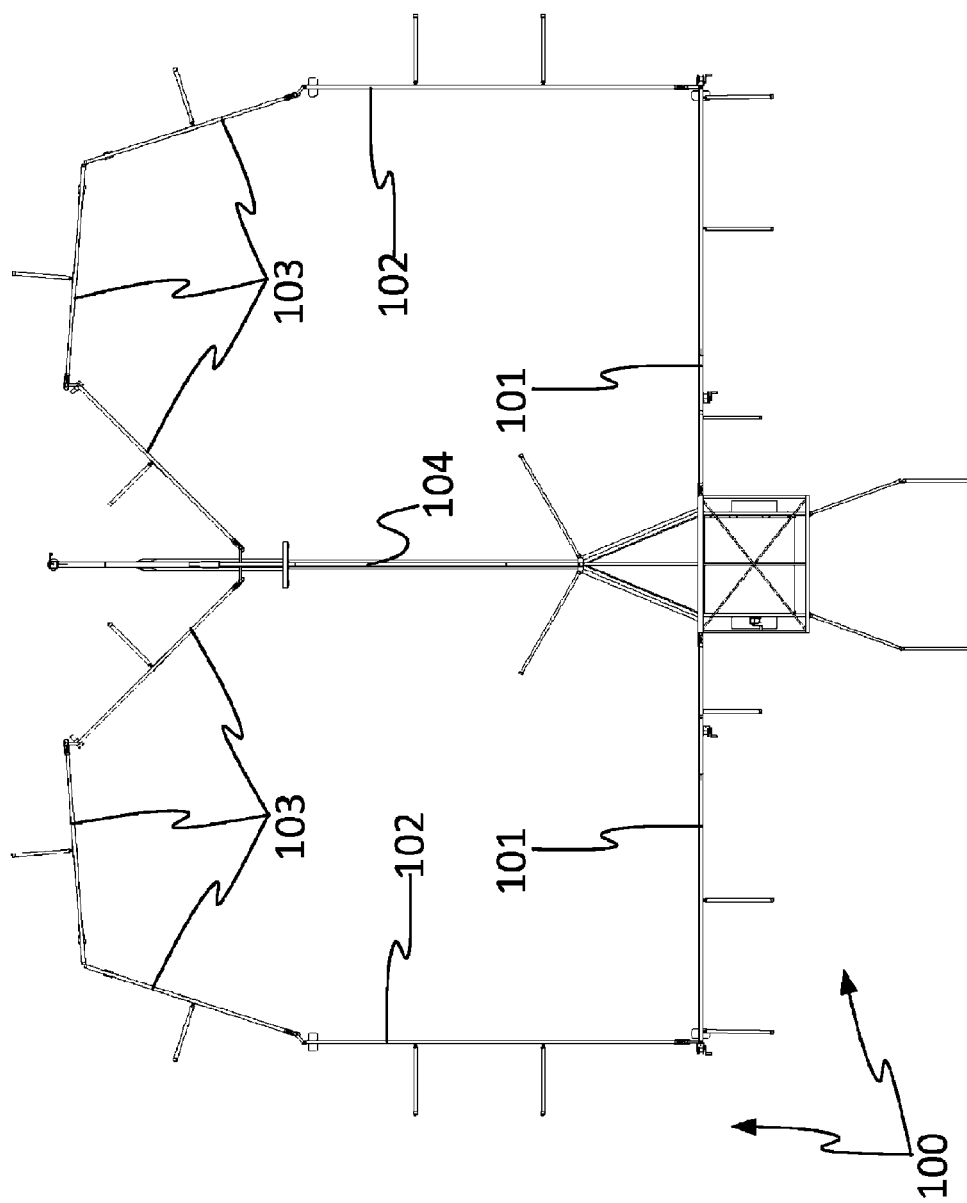
FIG. 4 is a top view of an embodiment of the Portable Cattle Wing with the wing panels in the deployed orientation.

Embodiments of the Portable Cattle Wing are comprised of two halves comprised of matched components. That is, one twenty-four foot panel 101, one twenty-two foot panel 102, and three twelve foot panels 103 are arranged on either side of the central main frame. The twenty-four foot panels are positioned next to the rear cage 107 and are connected to the rear cage 107 via one or more off-set hinges 106. Connected to each twenty-four foot panel 101 via off-set hinges 106 is one twenty-two foot panel 102. Connected to each twenty-two foot panel 102 via off-set 106 hinges is one rear twelve foot panel 201 (one of the three twelve foot panels arranged on each side of the main frame). Connected to the main frame via one or more off-set hinges is a first front twelve foot panel 202 (a second of the three twelve foot panels arranged on each side of the main frame) which is, in turn, connected via one or more off-set hinges to a second front twelve foot panel 203 (the third of the three twelve foot panels arranged on each side of the main frame). The second front twelve foot panel 203 can be arranged to form a closed corral on one or both sides of the main frame (see FIG. 2) by latching with the rear twelve foot panel 201. In another configuration, the second front twelve foot panel 203 can be arranged to form an alley way on one or both sides of the main frame (see FIG. 6) with the rear twelve foot panel 201.

Used on the various panels are a plurality of swing-out braces 105. Each swing out brace 105 is comprised of a pin 901; a pipe 902, where the pin 901 is positioned within the pipe 902 to allow the brace to freely swing; a bracket 903 that forms an bracket aperture for a bolt and wherein the bracket 903 is weldedly affixed to the pipe 902; a brace 904 comprising an extended brace foot 905 that helps steady the components on the ground.

The hinged connections are comprised of an offset hinge 106 constructed so that when the panels are folded the panels are able to fold upon themselves into a compact position. Each offset hinge 106 is comprised of a double hinge comprised of one or more loop hinges 1201 where each loop hinge 1201 is weldedly attached to an end of a panel 1202. The end of a panel 1202 can be the end of a panel of any length. The loop hinge encompasses the hinge pipe 1203 of the offset hinge 106. The hinge pipe 1203 is also secured to the end of a panel 1202 by a hinge pipe bracket 1204. The hinge pipe bracket is comprised of a bracket plate 1205 and a pipe bushing 1206. The pipe bushing 1206 is affixed to the bracket plate 1205 via a fastener. Further, the hinge pipe 1203 slides through the pipe bushing 1206 and is free to rotate within the pipe bushing allowing the offset hinge 106 to freely move. The hinge pipe 1203 is weldedly affixed to the end of a second panel 1207, also of any length. An offset hinge at each connection between panels allow the panels to rotate relative to the adjacent panel yet remain in mechanical contact with the adjacent panel.

A plurality of panel wheels 501 are affixed to the bottom of the various sized panels so that in conjunction with the plurality of offset hinges the various panels can be expanded, collapse and arranged as needed by the user.

The embodiments comprise a rear cage 107 at the rear of the embodiments. The rear cage is comprised of four six foot panels 301 (two on each side) that unfold from the rear of the rear cage 107 and a fold down floor 302 to support the bottom of the cage. These four six foot panels 301 can be arranged so that the embodiments can be engaged with other corral sorting pens so that the user can sort cattle as needed. The rear cage 107 can stow a 4-wheel all-terrain vehicle with the fold down floor 302 in the down position. The fold down floor 302 lays down and locks the bottom of the cage together when in transport.

With the fold down floor 302 in the up position cattle can move in through the rear cage and sorted into the right or left pen as necessary. The fold down floor 302 is raised or lowered with a floor winch 306. The rear cage 107 also comprises two rear cage panels 303. When closed the rear cage panels 303 form a V-shape in it to let cattle go to the right or left to dates with spring loaded latches to hold the cattle. In one preferred embodiment, each of the rear cage panels 303 is 7 foot 8 inches long. The rear cage is also comprised of two bottom frame members 304 lying flat and a plurality of top frame members 305. In one preferred embodiment each bottom frame members 304 is 6-inch channel.

The a goose-neck hitch 108 is comprised of two twelve-foot panels 801 on each side of the goose-neck hitch 108 to provide support for the embodiments while they are being transported. The pin 802 has sufficient size to support the embodiments during transport. In addition the t two twelve-foot panels 801 running parallel with each other makes a weighing for cattle to load in a stock trailer.

Figure 5:
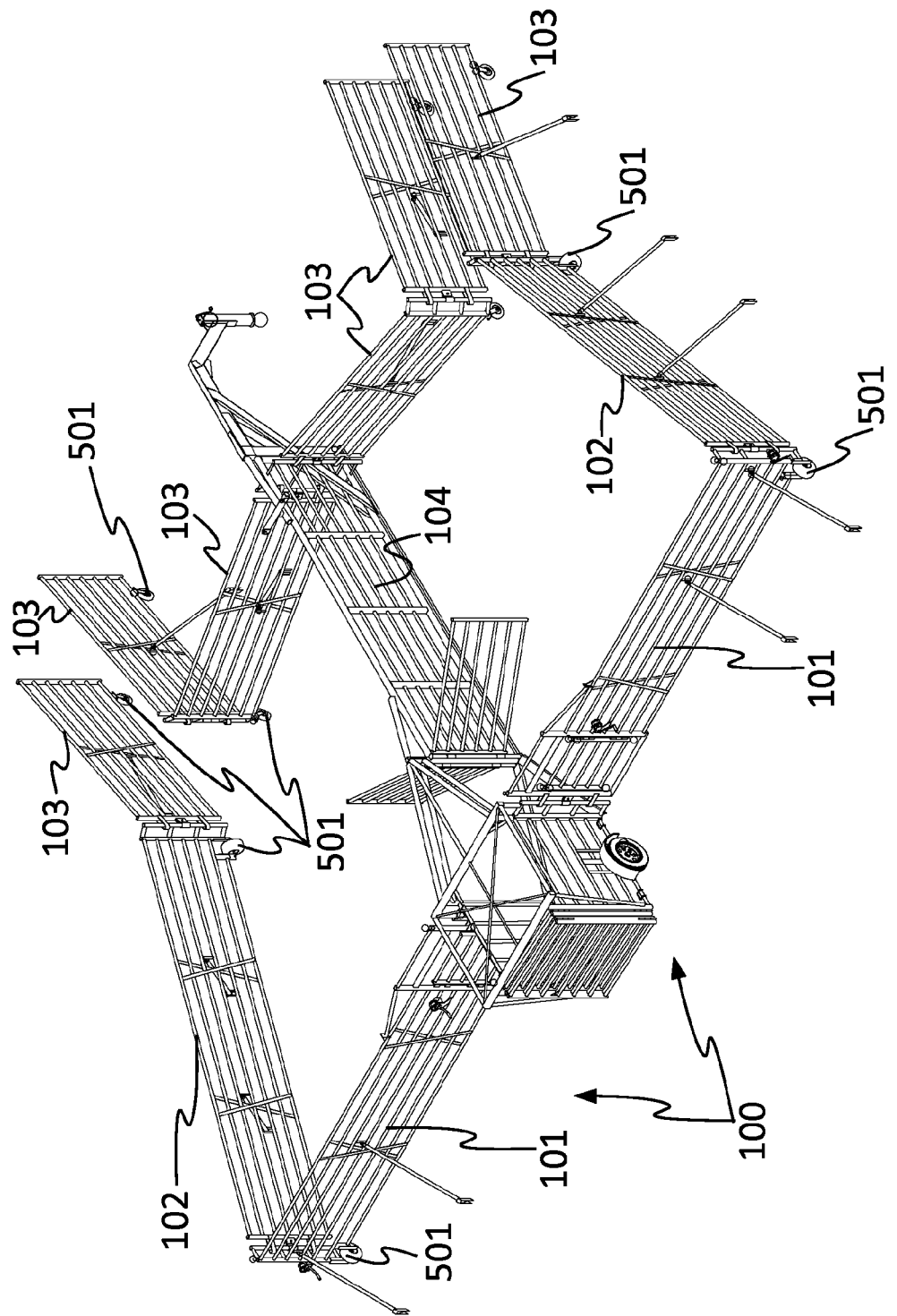
FIG. 5 is a perspective view of an embodiment of the Portable Cattle Wing with the wing panels in the deployed orientation.
Figure 6:
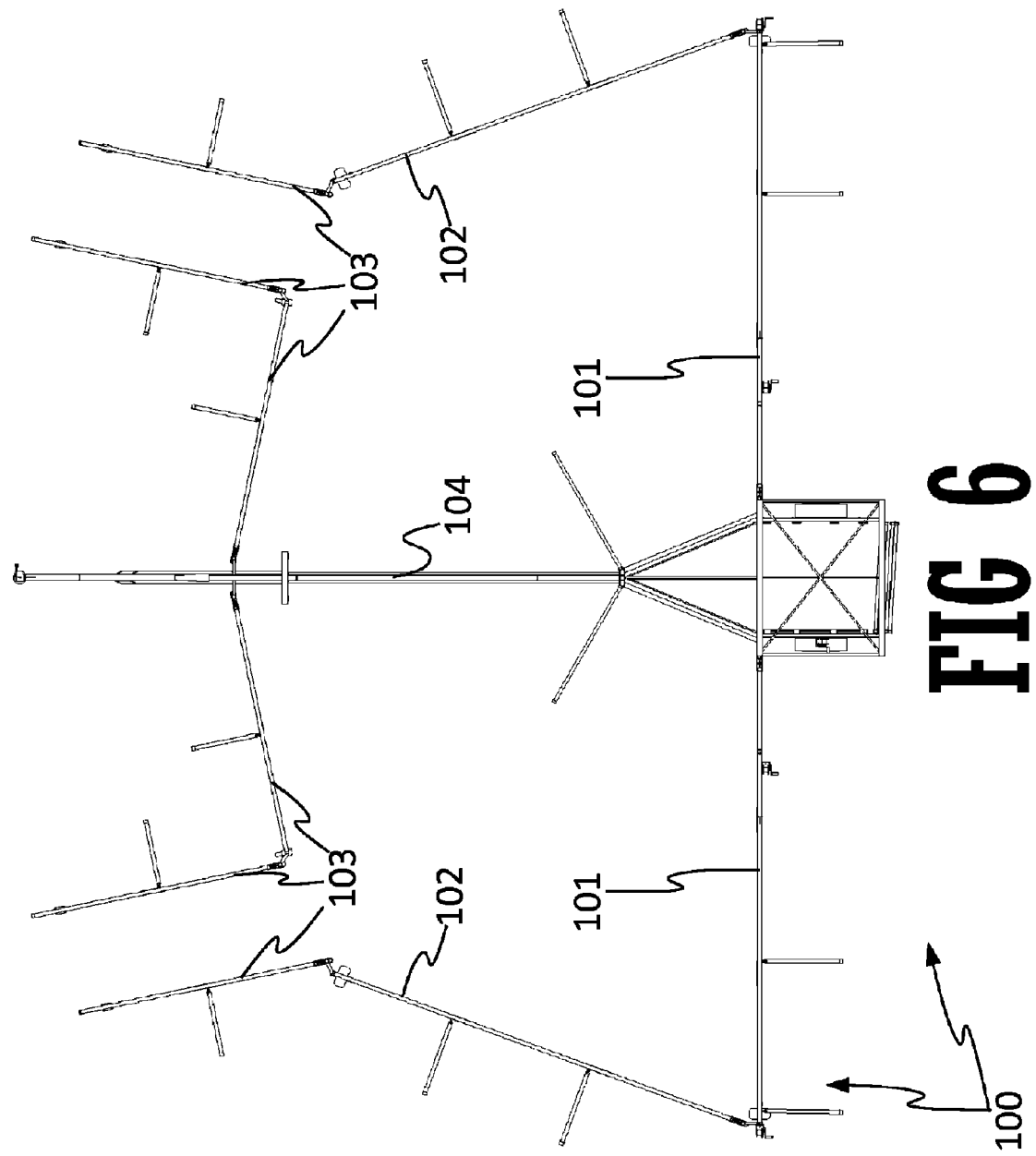
FIG. 6 is a top view of an embodiment of the Portable Cattle Wing with the wing panels in the deployed orientation.
Figure 7:
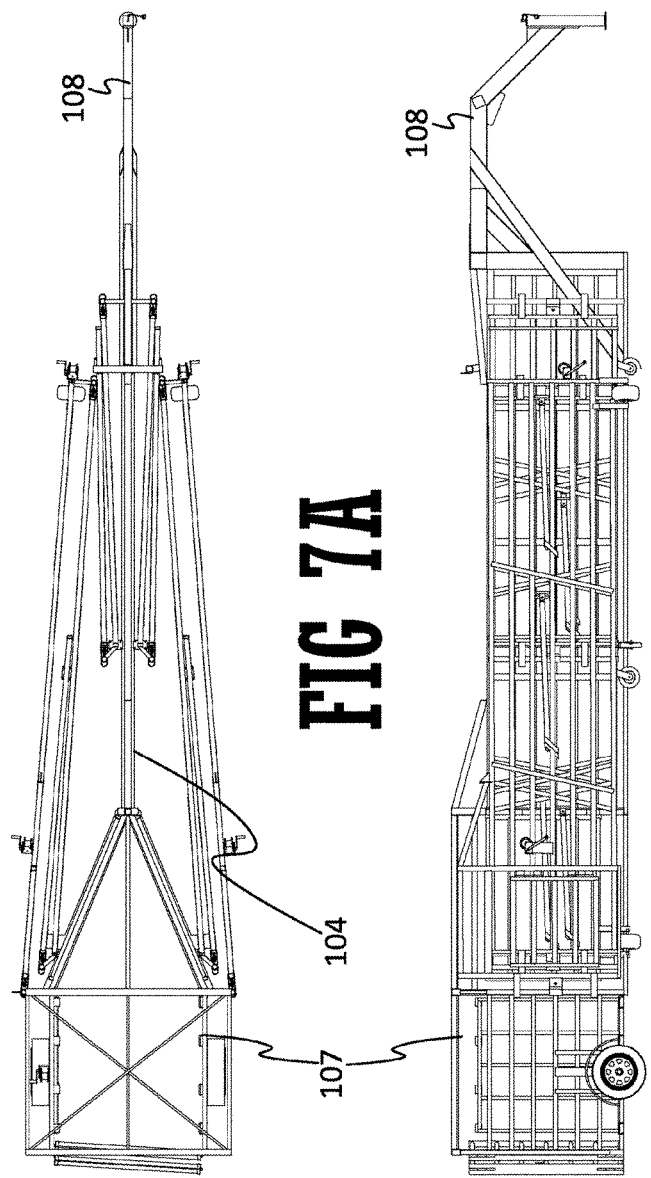
FIG. 7A is a top view of an embodiment of the Portable Cattle Wing with the wing panels in the folded orientation.
FIG. 7B is a side view of an embodiment of the Portable Cattle Wing with the wing panels in the folded orientation.
Figure 8:
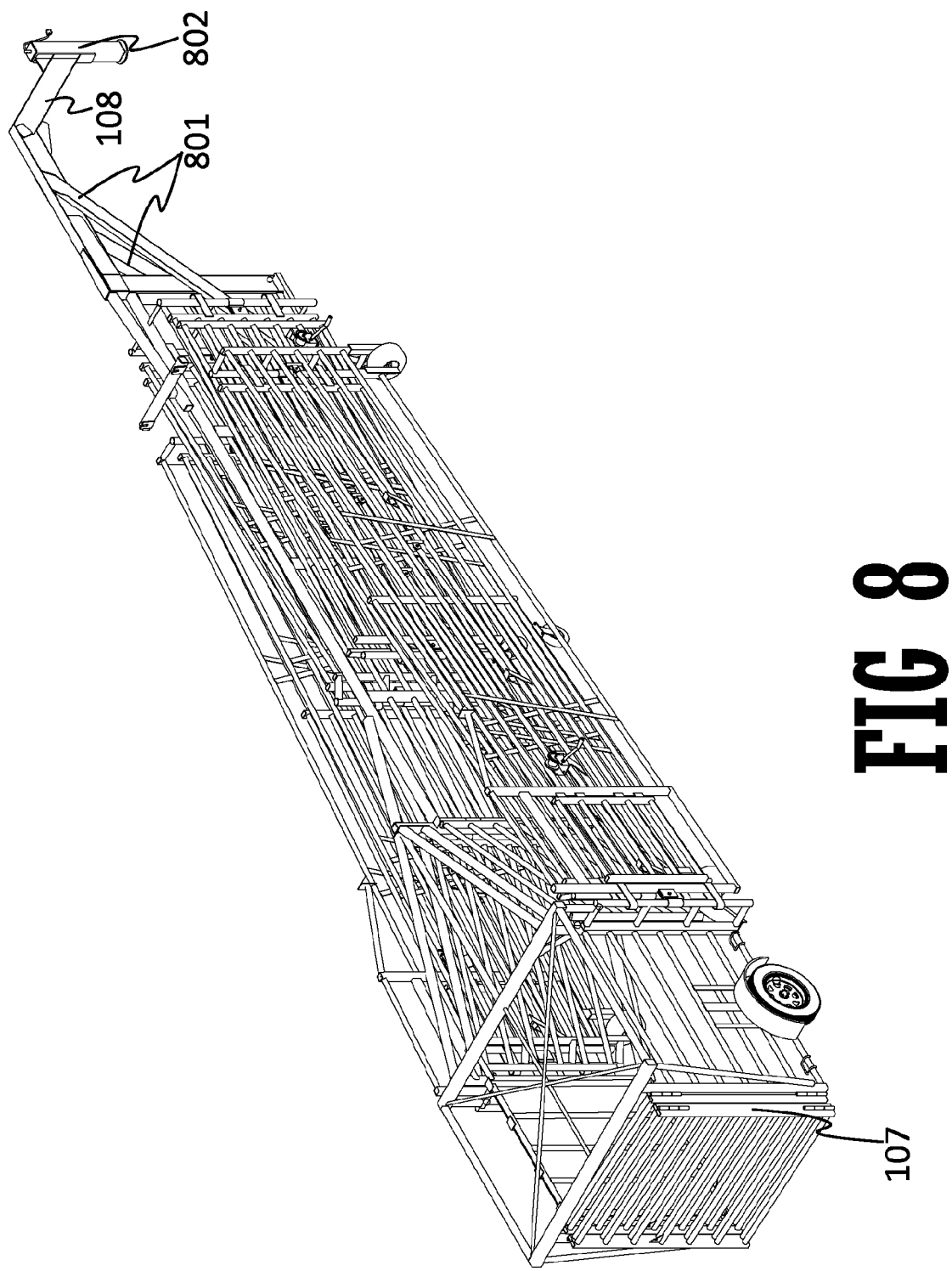
FIG. 8 is a perspective view of an embodiment of the Portable Cattle Wing with the wing panels in the folded orientation.
Figure 9:
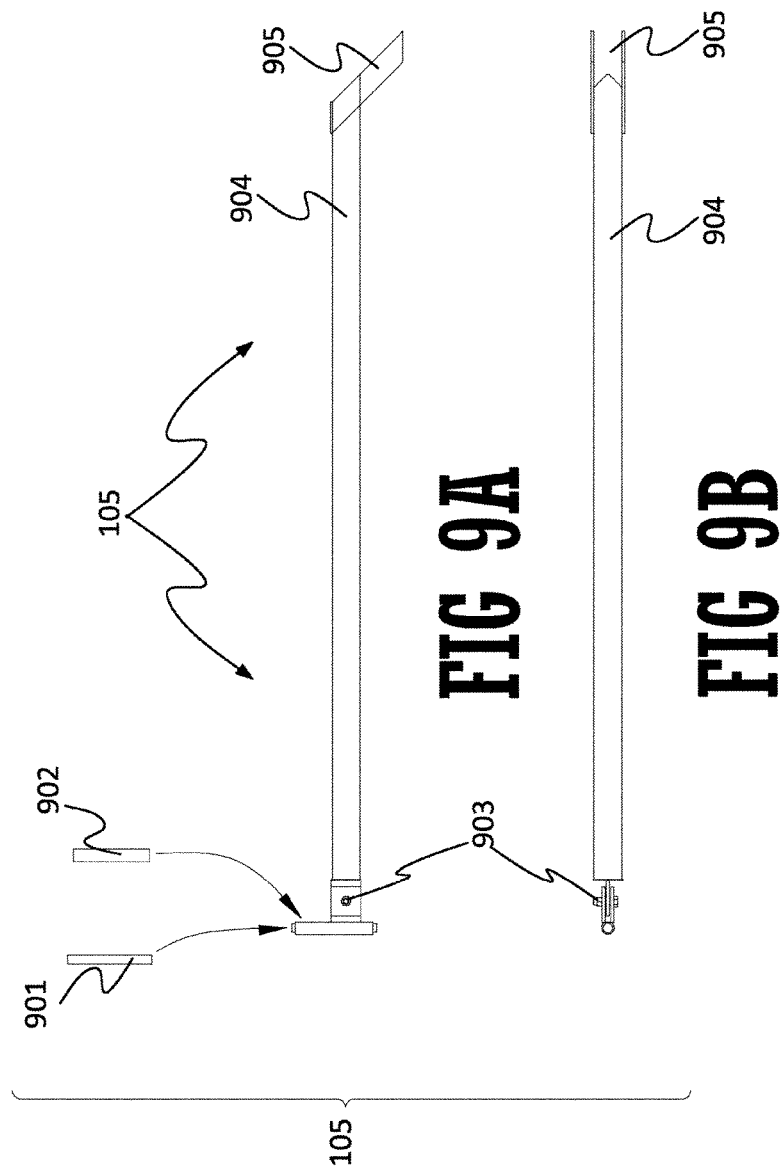
FIG. 9A is a side view of an embodiment of the swing out brace.
FIG. 9B is a top view of an embodiment of the swing out brace.
Figure 10:
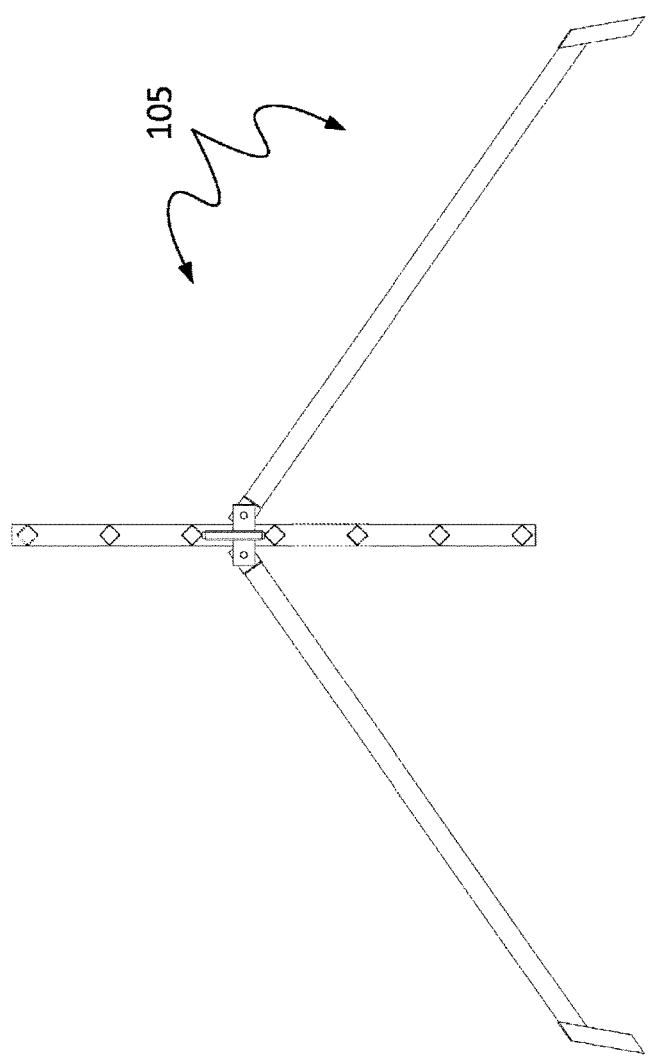
FIG. 10 is a side view of an embodiment of the Portable Cattle Wing and the swing out brace.
Figure 11:
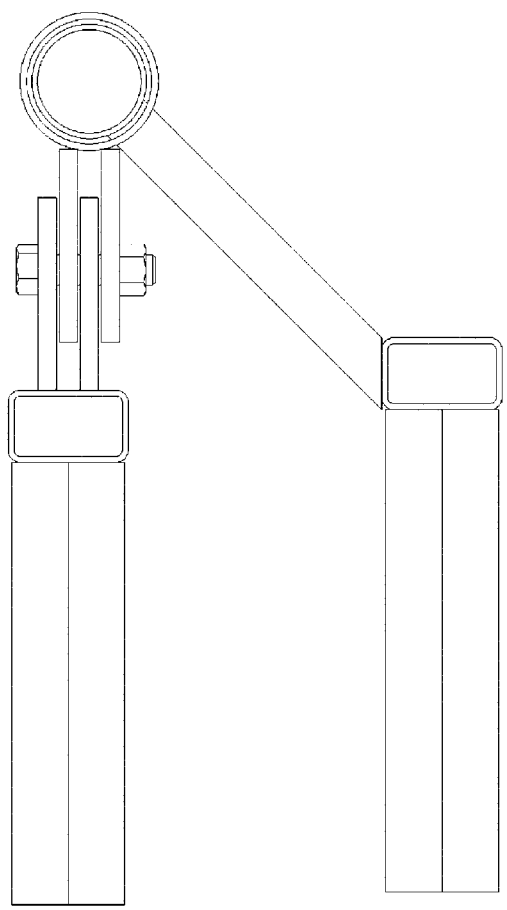
FIG. 11 is a top view of an embodiment of the Portable Cattle Wing and the offset hinge.
Figure 14:
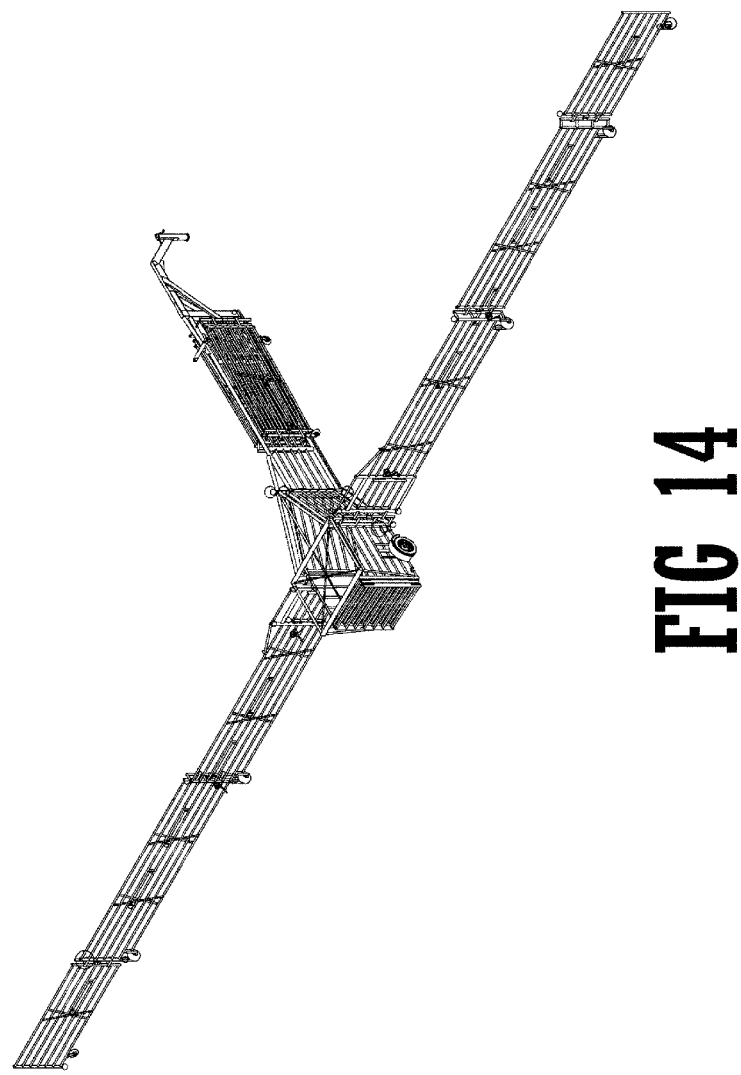
FIG. 14 is a perspective view of an embodiment of the Portable Cattle Wing with the wing panels in the extended orientation.

The best mode of operation of the embodiments, the embodiments can be arranged by opening and closing the several panels. For example the panels can be opened so that the panels form a closed corral as shown in FIGS. 1 through 4. Alternatively, the panels can be arranged to form an alley way as shown in FIGS. 5 and 6. The panels may also be collapsed so that the embodiments may be transported as shown in FIGS. 7A, 7B, and 8.

What is claimed is:

1. A portable cattle wing comprised of
   a. two twenty-four foot panels, wherein each twenty-four foot panel is comprised of a four foot gate;
   b. two twenty-two foot panels;
   c. two twelve-foot panels;
   d. four twelve-foot panels;
   e. a central main frame;
   f. one or more swing-out braces;
   g. one or more off-set hinges;
   h. a cage; and
   i. a goose-neck hitch.

2. The portable cattle wing described in claim 1 wherein one of the twenty-four foot panels, one of the twenty-two foot panels, one of the twelve foot panels, and two of the twelve foot gates are arranged on either side of the main frame.

3. The portable cattle wing described in claim 1 where the swing out brace is comprised of
   a. a pipe;
   b. a pin where the pin is positioned within the pipe to allow the brace to freely swing;

c. a bracket that forms a bracket aperture for a bolt and wherein the bracket is weldedly affixed to the pipe;

d. a brace comprising an extended brace that forms a brace aperture for a bolt; and e. a bolt wherein the bolt is placed through the bracket aperture and the brace aperture thereby securing the brace to the pipe via the bracket.

4. The portable cattle wing described in claim 1 where a rear cage located at the rear of the embodiments is comprised of a. four six foot panels, with two positioned on each side of the rear cage, that unfold from the rear of the rear cage, wherein the four six-foot panels can be arranged so that the embodiments can be engaged with other corral sorting pens;

b. a fold down floor to support the bottom of the rear cage; and c. a winch.

5. The portable cattle wing described in claim 1 comprised of two matched halves where each matched half is comprised of one of the twenty-four foot panels, one of the twenty-two foot panels, and three of the twelve foot panels are arranged on either side of the central main frame, wherein the twenty-four foot panels are positioned next to a rear cage and are connected to the rear cage via one or more off-set hinges, and where connected to each of the twenty-four foot panel via off-set hinges is one of the twenty-two foot panel, and where connected to each twenty-two foot panel via off-set hinges is one of the rear twelve foot panel, and where connected to the main frame via one or more off-set hinges is a first of the front twelve foot panel, which is, in turn, connected via one or more off-set hinges to a second of the front twelve foot panels, and where the second of the front twelve foot panels can be arranged to form a closed corral on one or both sides of the main frame by latching with the rear twelve foot panel.

* * * * *